United States Patent [19]

Picard

[11] 3,717,252
[45] Feb. 20, 1973

[54] SELF-CLEANING FILTER

[76] Inventor: Marcel Picard, Rue Pasteur, Saint-Agulin, France

[22] Filed: June 28, 1971

[21] Appl. No.: 157,316

[30] Foreign Application Priority Data

July 9, 1970    France.................................7025419

[52] U.S. Cl..............................210/108, 210/333
[51] Int. Cl. .............................................B01d 29/38
[58] Field of Search.......210/107, 108, 112, 332, 333

[56] References Cited

UNITED STATES PATENTS 3,283,903    11/1966    Muller...........................210/108
3,388,799    6/1968    Rymer...........................210/108 X Primary Examiner—John Adee
Attorney—Holcombe, Wetherill & Brisebois

[57] ABSTRACT

Self-cleaning filter comprises a horizontal pressure unit mounted to rotate about a vertical axis. Counter-current cleaning occurs when both faces of a piston inside the pressure unit are subjected to the pressure within the filter, the extra pressure required to cause a flow of cleaning fluid being supplied by a spring which acts on the piston and is compressed when one face of the piston is vented to atmosphere.

5 Claims, 7 Drawing Figures

SELF-CLEANING FILTER

SUMMARY OF THE INVENTION

My prior application Ser. No. 792,696, filed in the United States on Jan. 21, 1969 now U.S. Pat. No. 3,608,722, relates to a filter adapted to operate as either a static filter or an automatically self-cleaning filter and characterized by the fact that the pressure of the fluid being filtered is used to actuate an independent pressure unit which is readily removable and located at the upper part of the filter above a columnar filter member, which member is also adapted to be easily removed without the use of tools and without removing the principal inlet and outlet ducts.

One of the characteristics of this filter which has permitted these results to be attained is that the pressure unit is mounted to rotate about a vertical axis and consists of a horizontal cylinder in which a piston reciprocates from left to right and vice verse, while cooperating at the ends of its path of travel with a reversing valve which connects a chamber between said cylinder and piston with either the internal pressure of the filter or atmospheric pressure.

Another characteristic of the filter described in application Ser. No. 792,696, resides in the provision of a ratchet device which drives said pressure unit in rotation from one column to the next during the stroke of the piston in one direction, whereas a counter-current injection of cleaning liquid takes place during the stroke of the piston in the opposite direction, during which the pressure unit remains stationary in alignment with a predetermined column which is to be cleaned.

The present invention is directed to certain improvements to the pressure unit and to the reversing valve which cooperates with the piston of this pressure unit.

In the first place, the differential or stepped piston described in the previous patent is replaced by a piston having a constant diameter cooperating with a cylinder which is also of constant diameter.

In this new arrangement the spring which cooperates with the piston, instead of being in compression during countercurrent cleaning which took place in the previously described apparatus, when the differential chamber of the piston was in communication with the atmosphere, in response to the higher internal pressure prevailing inside the filter and opposing to this compression a resistance less than the difference between said internal pressure and atmospheric pressure, creates on the contrary only the excess pressure necessary counter-current cleaning during the stroke of the piston in which its rear face is subjected to said internal pressure, while the difference between the internal pressure of the filter and atmospheric pressure compresses said spring during the stroke of the piston in the opposite direction.

Moreover, the operation of the reversing valve has been improved and, instead of actuating this valve by means of a coil spring obliquely engaging a projection, it is actuated by a leaf spring cooperating with a pivotal member. The amplitude of of the pivotal movement of this member is limited by suitable stop means and said pivotal member is coaxial with a cam mounted to turn freely about its axis and located in a recess in said pivotal member. This cam is adapted to engage an axis on which one of the arms of the leaf spring is mounted at the two ends of the path of travel of the piston so as to prevent said pivotal member from reversing the position of the reversing duct until the piston has reached one of the ends of its stroke.

Another improvement embodied in the filter according to the present invention resides in the provision of a check valve permitting the exact regulation of the quantity of cleaning fluid counter-currently injected into each column.

Finally, the device for rotating the pressure unit which comprised two cooperating superposed discs superposed along radial generatrices has been replaced by a more accurate device comprising an eccentric cam driven by a gear fixed to the piston of said pressure unit and into which a driving pawl may be projected by a radial spring, said pawl being adapted to slide on the outer surface of the teeth of a ratchet wheel coaxial with said cam without driving it in rotation during one direction of rotation of the cam, while the end of this pawl drives a pressure member fixed to the said ratchet member during the rotation of the cam in the other direction, corresponding to the compression phase of the spring.

The characteristics of the new filter according to the present invention will be better understood from a reading of the following description of a preferred embodiment of this filter, given purely by way of example and with reference to the accompanying drawings, in which.

Figure 1:
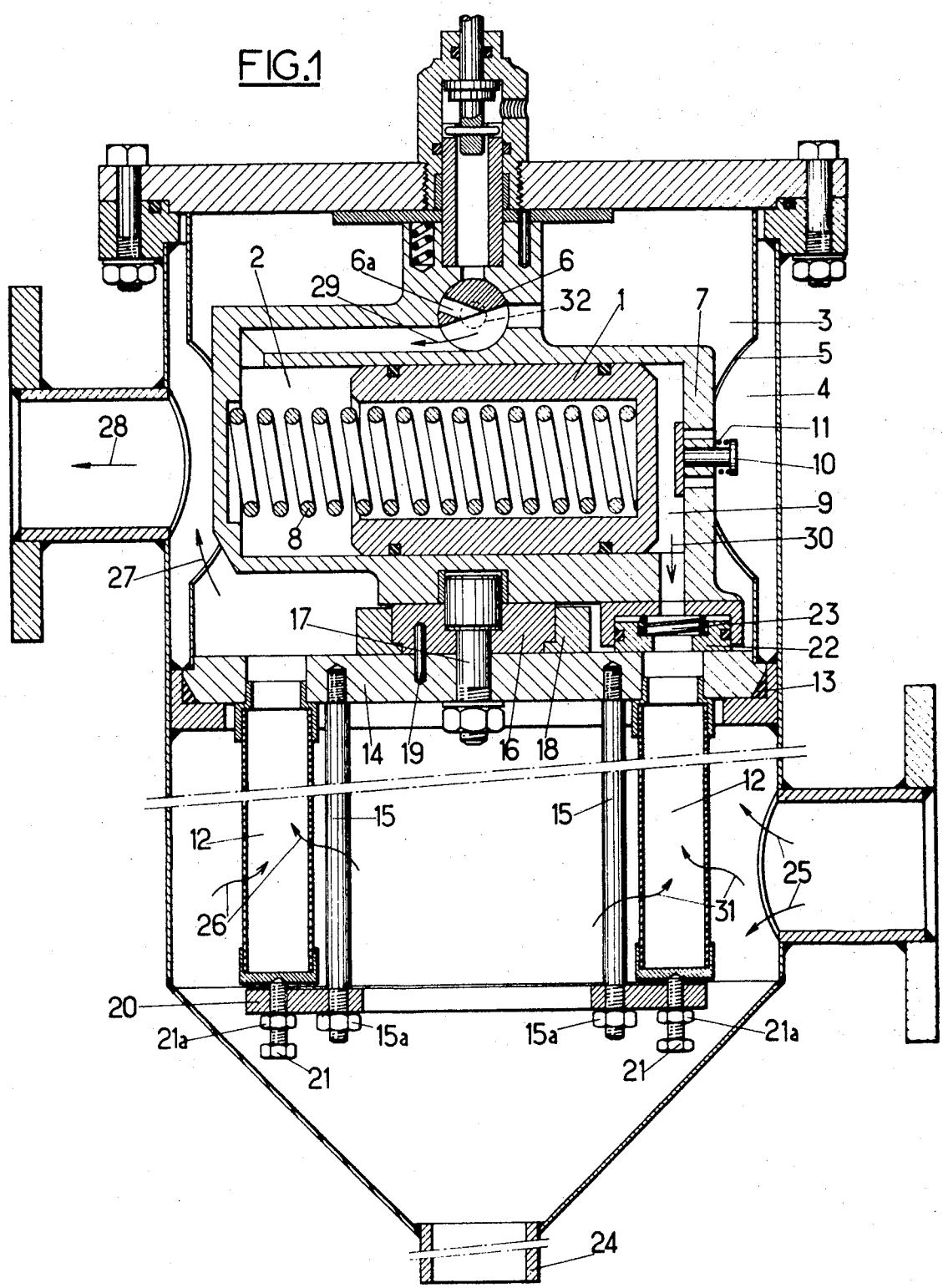
FIG. 1 is a diametrical sectional view of the new filter with its upper part constituted by said pressure member and with the piston represented in a position corresponding to the end of the stroke in which a column is cleaned by counter-current flow.

It will be seen from FIG. 1 that the space 2 which is in communication with the inside of the piston 1 is connected through a duct 6 to the spaces 3 and 4 which are connected to each other by an opening 5 and are subject to the internal pressure of the filter. The piston 1 reciprocates inside the cylinder 7 and is actuated by a spring 8, when the piston 1 is subjected on its two surfaces to the same pressure, or by the combined effect of atmospheric pressure on the front face of the piston, the internal pressure of the filter on its rear face, and the resistance of the spring to compression. The spring 8, when expanded, creates in the space 9 an excess pressure which closes the check valve 10 biassed by the spring 11. The excess pressure in the chamber 9 causes the counter-current cleaning of a column in the direction of the arrow 12. When the piston 1 is at its extreme right position, the valve 6 also visible on FIG. 1 assumes a position in which its duct 6a is vertical and connects the chamber 2 with atmospheric pressure. The pressure in the spaces 3 and 4 is then greater than atmospheric pressure and the check valve 10 opens and the pressure in the chamber 9 in excess of the atmospheric pressure in chamber 2 compresses the spring 8.

The piston 1 then returns to the left until, as will be hereinafter seen, the valve member 6 again reverses and connects the chamber 2 to the internal pressure of the filter which prevails in the chamber 9.

The spring 8 may then expand and return the piston 1 to the right with counter-current cleaning of another column and closing of the check valve 10 biassed by the spring 11.

The new filter operates as follows: the filtered fluid rises normally in the different filtering columns 12 in the direction of the upper part of the filter, except for the column which is represented on the right part of FIG. 1, in which said filtered fluid flows out in the opposite direction of the lower part of the filter during its cleaning.

The separation between the fluid to be filtered and the filtered fluid which is lodged in the upper part of the filter, above the filtering columns 12, is obtained by a joint 13 which is compressed when the filter is closed at its upper part.

The filtering columns 12 are joined together and with a plate 14 by means of distance-pieces 15.

The plate 14 is joined also with a plate 16 by means of a central bolt 17 which applies said plate 16 against a shoulder of a peripheral ring 18.

The plate 16 can not rotate with respect to the plate 14, and is connected with said plate by a pin 19.

The filtering columns 12 are hold at their lower part by means of a plate 20 and by screws 15a which cooperate with the lower part of the distance-pieces 15.

Further, the tightness of the two ends of the columns 12 is ensured by means of screws 21 which are provided with counter-nuts 21a.

It is to understand that the column represented on the right part of FIG. 1 is, during its cleaning by a counter-current, right in front of a ring 22 in the central part of which passes said counter-current of fluid produced by said pressure member which constitutes the upper part of the filter.

Said ring 22 is applied against the plate 14 by a spring 23.

At the lower part of the filter is provided a conical bottom which ends in the form of a ring 24.

Said ring can be sealed by a bush or by a cock, to allow the discharge of residual particles which fall in said conical bottom, especially during the cleaning of the columns 12 without reaching the other filtering columns.

Besides, the fluid to be filtered enters in the direction of the arrows 25, passes in the columns which are not submitted to a counter-current, in the direction of the arrows 26, the filtered fluid going up along the arrow 27 and going out of the filter in the direction of the arrow 28.

The filtered fluid, which is in the space 3 can pass through the subsidiary shell 6, in the direction of the arrow 29, to balance the pressure of the same fluid which acts on the right part of the piston 1 during the cleaning.

The spring 8, during said balance, creates the return to the right of the piston 1, and generates the counter-current of filtered fluid in the right column 12 which should be cleaned, said counter-current having the direction of the arrow 30.

The cleaning which is carried out on the external wall of said right column 12 is obtained by a flowing of filtered fluid in the direction of the arrow 31, and the impurities which are separated from said column fall in the conical bottom of the filter and accumulate at the level of the ring 24, as was previously mentioned.

The axis 32 of the reversing mechanism of the subsidiary shell 6 is also represented on FIG. 1.

Figure 3:
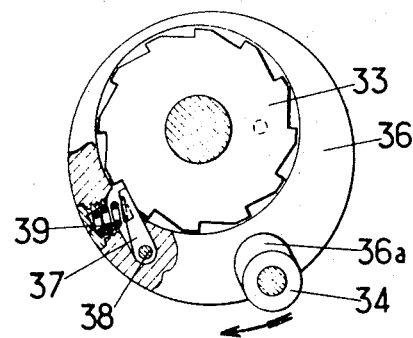
FIG. 3 is a cross sectional view taken along the line III—III of FIG. 2 showing the pressure member being driven in rotation during the return stroke of the piston after the counter-current injection of cleaning liquid.

The rotation of the pressure unit during the compression of the spring 8 is produced by the ratchet wheel 33 shown in FIG. 3.

Figure 2:
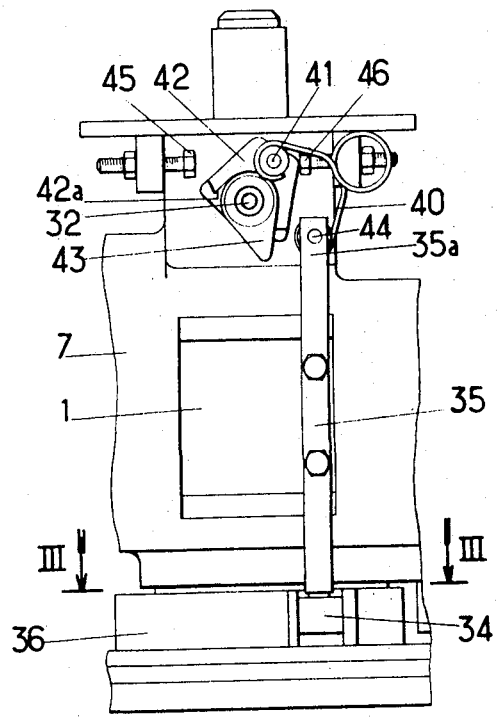
FIG. 2 is an elevational view of the pressure member showing the vertical arm fixed to the piston which controls the reversal of the valve.

The roller 34 which is attached to the piston 1 by the vertical member 35 shown on FIG. 2 drives the cam 36 provided with groove 36a. This rotation is transmitted to the ratchet wheel 33 by the pawl 37 which is mounted to swing about the axis 38 and is biassed by a spring 39 against the ratchet wheel 33.

The rotation of the cam 36 is thus transmitted to the ratchet wheel 33 during the return of the piston to the left of FIG. 1, whereas, when the piston moves to the right, that is to say, during the period in which liquid is injected counter-currently for cleaning purposes, the rotation of the cam 36 has no effect on the ratchet wheel 33, since the pawl 37 glides along the teeth of the ratchet wheel 33 until it reaches the next notch, after having rotated through an angle which, as shown in FIG. 3 is 30°, assuming a filter having 12 equal distance columns.

Figure 4:
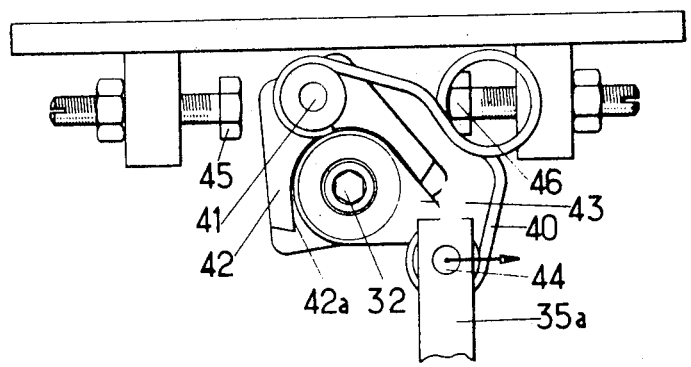
FIG. 4 is an elevational view of the reversing valve shown a little before release of the cam permits the reversal of the valve.
Figure 7:
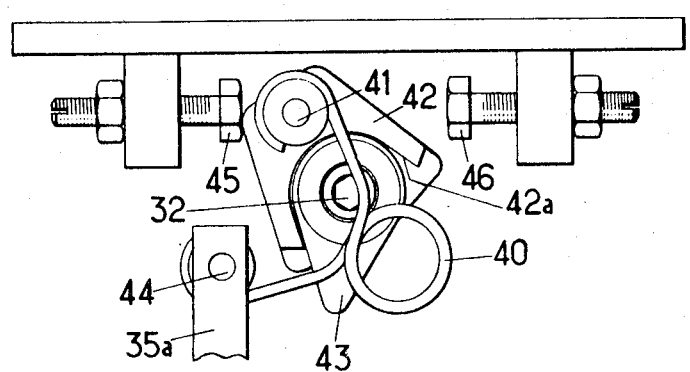
FIG. 7 is a view similar to FIG. 6 showing the position of the piston at the end of its stroke after reversal of the valve.

FIGS. 4 and 7 show the upper part 35a of the member 35.

The leaf spring 40 pivots about the axis 41 fixed to a bell-shaped member 42 provided with a recess 42a inside which a cam 43 may pivot within certain limits about an axis 32.

During the movement of the piston 1 toward the right in response to pressure by the spring 8, the spring 40, as a consequence of the movement of the part 35a of the member 35 passes from the relatively closed position shown on FIG. 7 to the substantially open position shown on FIG. 4 in which the two arms of the spring are spaced by a maximum distance.

Figure 5:
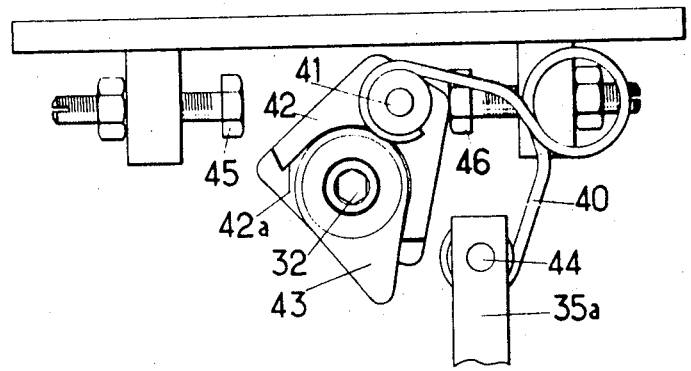
FIG. 5 is a view similar to FIG. 4 but showing the position at the end of the cleaning of a column.

When the vertical member 35 has moved sufficiently to permit the cam 43 to escape from the roller 44 fixed to the part 35a of this vertical member, with which it cooperates, the spring 40 closes, causing the member 42 to pivot, together with the cam 43, into the position shown in FIG. 5.

Figure 6:
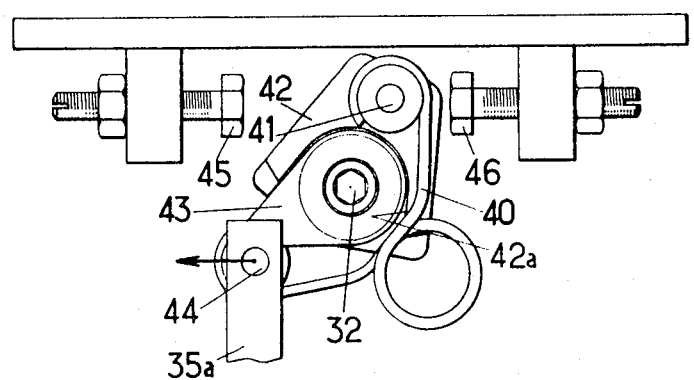
FIG. 6 is a view showing the same reversing valve while the spring is being compressed between two consecutive cleansings.

While the spring 8 is being compressed, that is after swinging of the members 42 and 43 and inversion of the valve member 6, the spring 40 opens again, as shown on FIG. 6, but the movement to the left of the part 35a of the vertical member 35 causes progressive pivoting of the cam 43 with respect to the member 42 without the member 42 being able to move substantially from the position which it occupies in FIG. 5. It is only when the member 35 reaches its extreme position to the left, shown in FIG. 7, that the cam 43 may escape from the roller 44 and that the leaf spring 40 may close while swinging the member 42 to the left until this member reaches an adjustable stop 45.

In like manner, FIG. 5 shows that the member 22, after swinging, encounters another adjustable stop 46. Since the stops 45 and 46 are adjustable and limit the path of travel of the member 42, the length of the angular path of travel of the valve 6 may be exactly regulated so as to place the chamber 2 in communication with atmospheric pressure through the duct 6a and the valve 6 during the course of return of the piston 1.

The function of the check valve 10, which closes during counter-current cleaning, that is to say during the stroke of the piston to the right, and which opens when the pressure inside the chamber 9 becomes substantially less than the internal pressure of the filter in response to the return of the piston 1, is, of course, obvious.

The internal pressure of the filter is always enough, in proportion to the atmospheric pressure on the opposite side of the piston, to successively overcome the force exerted by the spring 11 and then that of the spring 8.

It will of course be appreciated that the embodiment which has just been described may be modified as to detail without thereby departing from the basic principles of the invention as defined by the following claims.

What is claimed is:

1. In a self-cleaning filter of the type comprising a plurality of vertical filter columns equidistantly arranged about a vertical axis and a rotatable pressure unit for forcing a cleaning fluid into each column sequentially and counter-currently, which unit comprises a cylinder having a horizontal axis and a piston mounted to reciprocate therewithin, said cylinder being mounted to rotate about said vertical axis to bring the space between said piston and one end of said cylinder into communication with each column successively, a spring biassing said piston toward said one end of said cylinder, valve means connected to alternately subject the face of said piston remote from said one end alternately to the pressure prevailing within said filter and to atmospheric pressure, and means actuated by said cylinder at each end of its stroke for automatically reversing said valve means, the improvement according to which the other face of said piston is constantly subjected to the pressure within the filter, so that the pressure applied to produce counter-current cleaning is supplied solely by said spring, when both faces of the piston are subject to the pressure within the filter.

2. Filter as claimed in claim 1 which comprises a check valve for admitting fluid under the pressure prevailing within said filter to said one end of said cylinder, said check valve being spring biassed to a closed position, and positioned to be automatically closed when the pressure prevailing within said filter is applied to both faces of said piston.

3. Filter as claimed in claim 1 in which said valve means comprises a valve member which turns through an angle of substantially 60° between its two positions.

4. Filter as claimed in claim 3 comprising a leaf spring for actuating said valve member, said leaf spring having a first arm connected at its outer end to vertical means carried by said piston and a second arm connected at its outer end to a member mounted to pivot about a fixed axis, said member comprising a recess receiving a cam mounted to swing through an angle of substantially 150° about the same axis, and having an end projecting from said recess which contacts a roller mounted on said vertical piston-carried means so as to prevent said member from swinging until said piston is at one of the ends of its path of travel, at which time the ends of said spring arms are maximumly separated, and adjustable stop means limiting the swinging movement of said recess-comprising member.

5. Filter as claimed in claim 4 in which said vertical member carries at its lower end a roller which turns a cam mounted to rotate coaxially of a ratchet wheel attached to said pressure unit said cam carrying a pawl which is spring-biassed against the teeth of said ratchet wheel, whereby said piston, through said vertical member, cam and pawl, turns said ratchet wheel and pressure unit while the piston is moving to compress the spring which biasses, but has no rotating effect on said pressure unit when said piston is moving in the opposite direction, in which case said pawl slides on the teeth of said ratchet wheel.

* * * * *